(12) United States Patent
Fahley et al.

(10) Patent No.: US 6,401,327 B1
(45) Date of Patent: Jun. 11, 2002

(54) METHOD OF ASSEMBLING A MAGNET ASSEMBLY WITH SELF-CENTERING ASSEMBLY POSTS

(75) Inventors: Terry R. Fahley, Lakeville; Paul L. Johnson, Bloomington; David L. Duvick, Eagan, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/587,241

(22) Filed: Jun. 2, 2000

Related U.S. Application Data

(60) Provisional application No. 60/151,198, filed on Aug. 27, 1999.

(51) Int. Cl.[7] .............................................. H02K 15/02
(52) U.S. Cl. ...................... 29/596; 29/603.03; 29/759; 29/760
(58) Field of Search ............................ 29/603.03, 596, 29/732, 757, 759, 760

(56) References Cited

U.S. PATENT DOCUMENTS

| | | | |
|---|---|---|---|
| 4,509,251 A | 4/1985 | Gyi et al. ..................... | 29/603 |
| 4,969,252 A | 11/1990 | DiGregorio ................... | 29/603 |
| 5,404,636 A | 4/1995 | Stefansky et al. ............. | 29/603 |
| 5,406,696 A | 4/1995 | Walsh .......................... | 29/705 |
| 5,477,401 A | 12/1995 | Squires et al. ................ | 360/75 |
| 5,570,250 A | 10/1996 | Casey ......................... | 360/106 |
| 6,018,864 A | 2/2000 | Fahley et al. ................. | 29/732 |

OTHER PUBLICATIONS

Assembly Device illustrated in FIGS. AO–1 through AO–5 (prior to Jul. 1, 1998).

*Primary Examiner*—Carl E. Hall
(74) *Attorney, Agent, or Firm*—Westman, Champlin & Kelly, P.A.

(57) ABSTRACT

A magnet assembly including spacers having chamfered posts insertable in post holes of opposed spaced backirons. For assembly, chamfered posts are inserted into post holes on a first backiron. A second backiron is supported above the first backiron by an assembly slide to retain the second backiron against the magnetic attraction between the first and second backirons for preassembly alignment of the post holes relative to spacer posts. The assembly slide is withdrawn from the second backiron so that the second backiron is attracted toward the first backiron and spacer posts are inserted into post holes on the second backiron. A method for assembling a magnet assembly using an assembly slide to support a second backiron above a first backiron and withdrawing the slide from the second backiron to assemble components.

8 Claims, 13 Drawing Sheets

METHOD OF ASSEMBLING A MAGNET ASSEMBLY WITH SELF-CENTERING ASSEMBLY POSTS

CROSS-REFERENCE TO RELATED APPLICATION

This application claims priority to Provisional Application No. 60/151,198, filed Aug. 27,1999 and entitled "MAGNET MERGE TOOL".

FIELD OF THE INVENTION

The present invention relates to a magnet assembly. In particular, the present invention relates to a magnet assembly for a voice coil motor for a data storage device.

BACKGROUND OF THE INVENTION

A disc drive includes a plurality of stacked discs which are rotationally supported relative to a disc spindle and an actuator assembly movably supporting a plurality of data heads for reading and writing data to the discs. The actuator assembly includes an actuator drive typically a voice coil motor for actuating or positioning the heads relative to selected data tracks of the discs. The voice coil motor includes a magnet assembly defining a permanent magnetic field and an energizable coil coupled to an actuator block supporting the heads. A voltage is supplied to the coil to selectively operate and move the actuator block to align the data heads relative to predetermined data tracks of the disc.

A typical magnet assembly includes upper and lower pole plates or backirons which are supported in opposed spaced relation and at least one magnet coupled to one of the backirons to define a flux gap therebetween. An energized coil moves in the flux gap between the upper and lower pole plates and the magnet. For proper operation of the voice coil motor, magnets must be accurately aligned and assembled to upper and lower pole plates; and upper and lower pole plates should be accurately aligned and connected for accurate head placement relative to selected data tracks. The magnetic flux or force of the magnetic components makes it difficult to handle and assemble magnets relative to upper and lower pole plates. The attraction force between magnetic components must be controlled for placement and assembly of magnets and pole plates. The present invention addresses these and other problems, and offers advantages over the prior art.

SUMMARY OF THE INVENTION

The present invention relates to a magnet assembly including spacers having chamfered posts insertable into post holes of opposed spaced backirons. The chamfered posts are self centering in the post holes of the backirons to assemble the magnet assembly. Pole plates or backirons can be assembled to spacers with the chamfered posts using the magnetic attractive force of the magnets supported by the upper or lower pole plates. Chamfered posts at a first end of spacers are inserted into post holes on a first backiron. A second backiron is supported spaced from the first backiron by an assembly slide to retain the second backiron against the magnetic attraction prior to assembly. The assembly slide is withdrawn so that the second backiron is attracted toward the first backiron and chamfered spacer posts are inserted into post holes on the second backiron for assembly.

DETAILED DESCRIPTION OF ILLUSTRATIVE EMBODIMENTS

Figure 1:
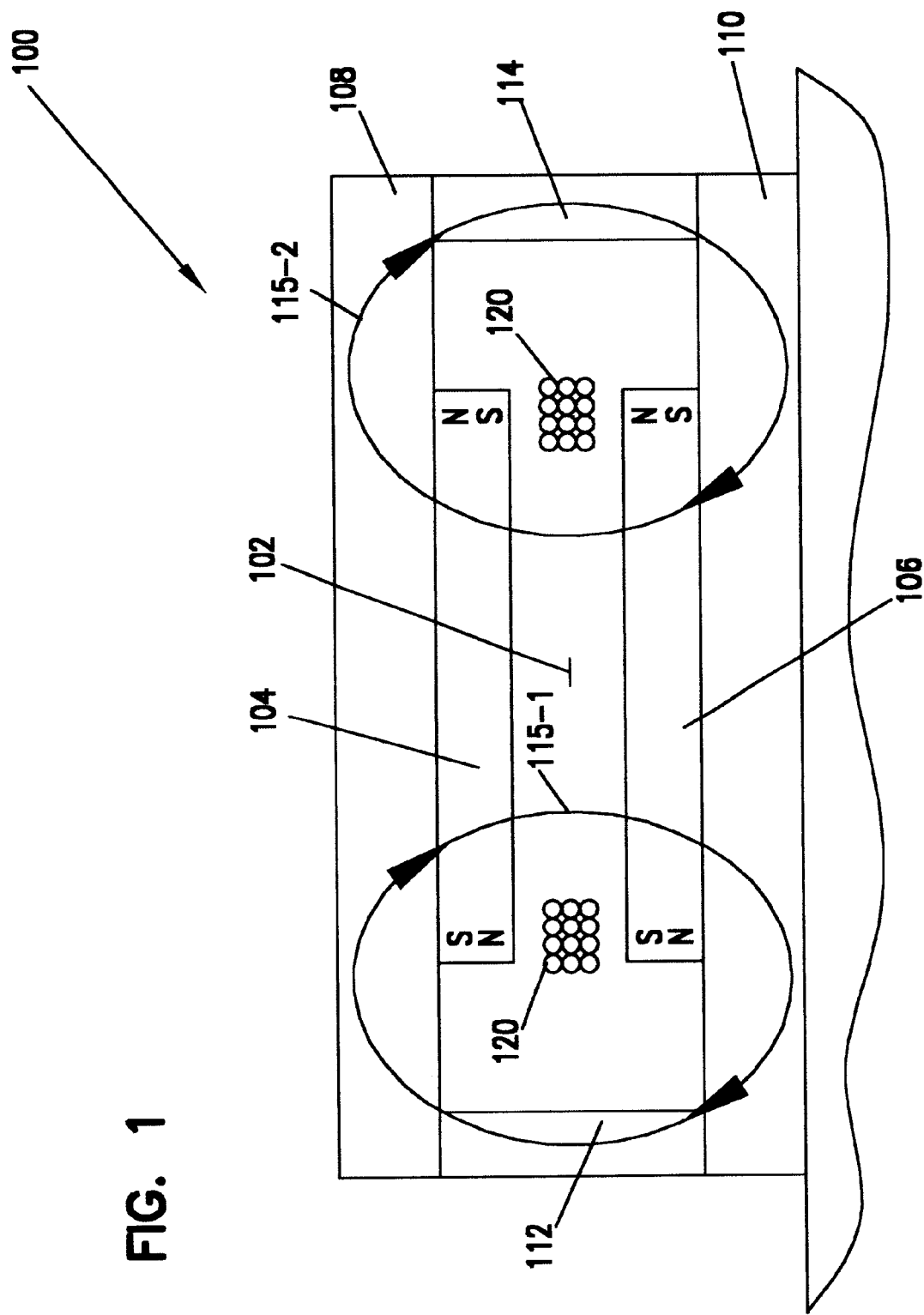
FIG. 1 is a schematic illustration of a magnet assembly including a permanent flux path.
Figure 2:
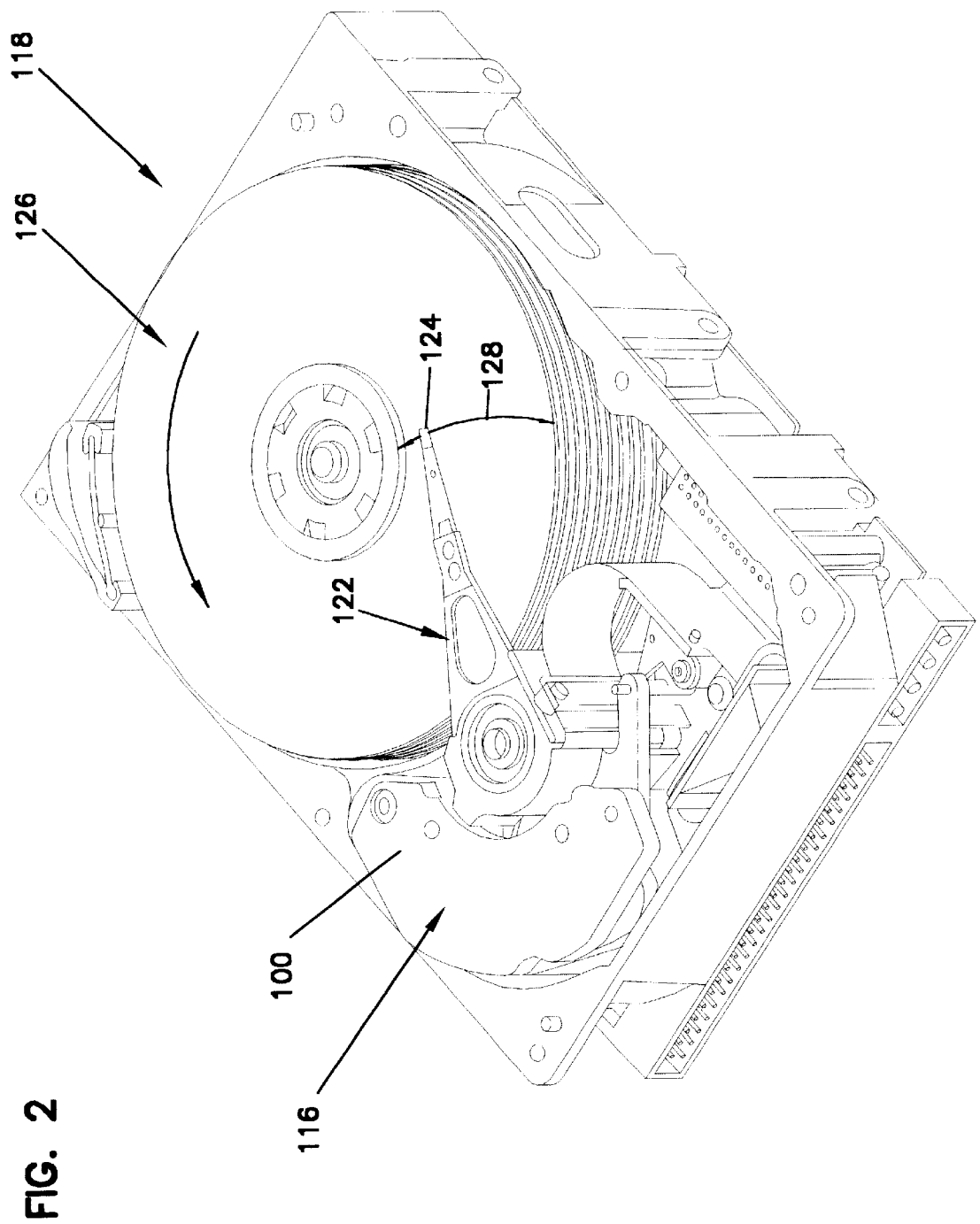
FIG. 2 is a perspective illustration of a data storage device including a voice coil motor cooperatively formed by a wound coil operable in a permanent flux path of a magnet assembly as illustrated in FIG. 1.

The present invention relates to a system and apparatus for assembling a magnet assembly 100 to form a flux gap 102 between magnetized magnets 104,106 and backirons 108,110. Magnets 104,106 are supported on backirons 108, 110 separated by spacers 112,114 to form flux paths 115-1, 115-2 for operating a voice coil motor 116 of a disc drive 118 as illustrated in FIG. 2. A wound coil 120 is supported in the flux gap 102 and is connected to an E-block assembly 122 shown in FIG. 2 to move the E-block assembly 122 to position data heads 124 relative to selected data tracks of a disc 126 for read or write operations. Current is supplied to the wound coil 120 to rotationally actuate the E-block 122 along an arcuate path as illustrated by arrow 128 for head placement relative to selected data tracks of a disc. Although a particular magnet assembly embodiment is shown, it should be understood that alternate magnet assembly embodiments including a magnet supported on one of the backirons 108, 110 can be used to form a flux gap for operation of a voice coil motor 116.

Figure 3:
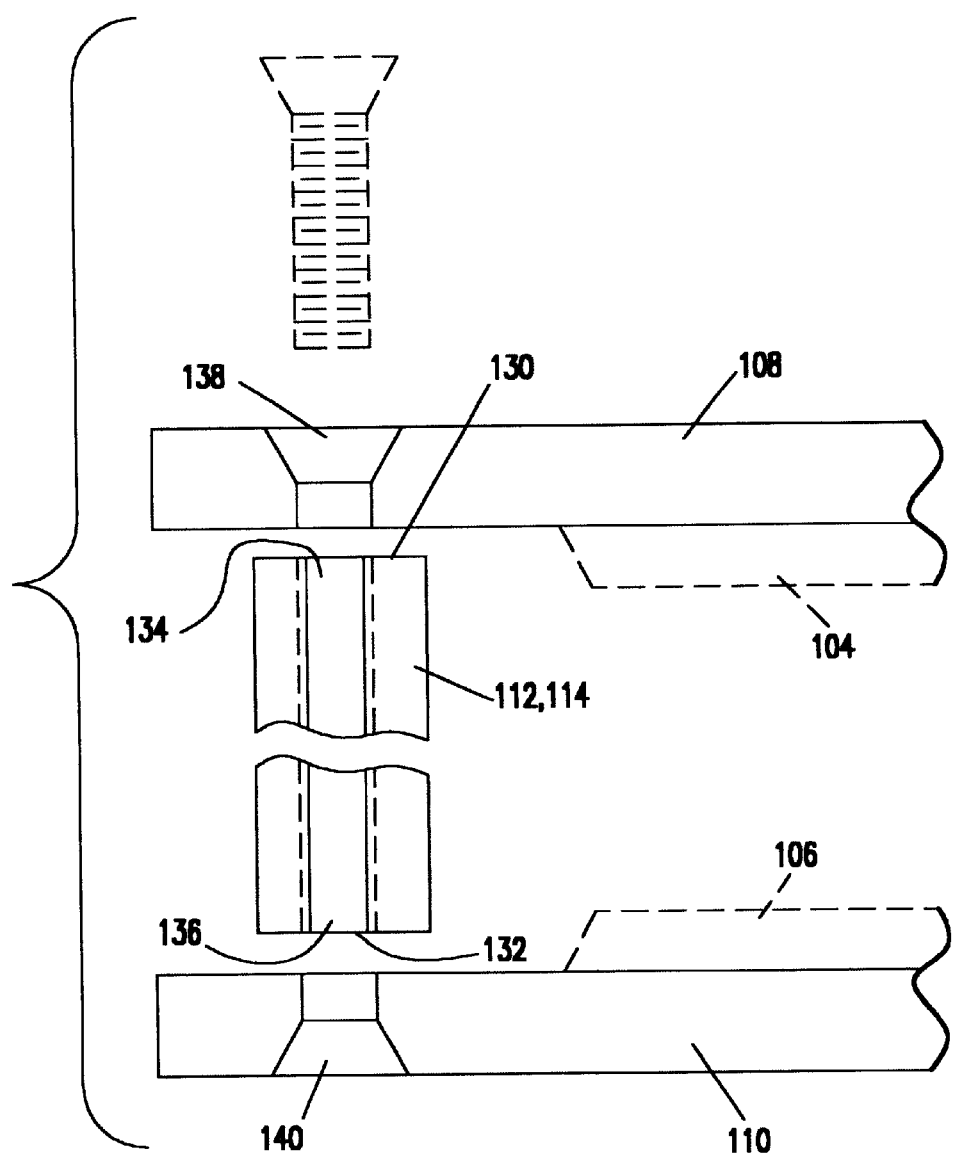
FIG. 3 is a prior art illustration of a magnet assembly including spacers supporting opposed spaced backirons.

In prior magnet assemblies illustrated in FIG. 3, spacers 112,114 include opposed, generally flat ends 130,132 having fastener openings 134, 136. Fastener openings 138,140 on backirons 108,110 are aligned with openings 134,136 on spacers 112, 114 to insert a fastener, illustrated in phantom, therethrough to connect backirons 108,110 in opposed spaced relation. Backiron openings 138, 140 must be centered or aligned with spacer openings 134,136 for connection and assembly. The magnetic attraction between magnets 104,106 or magnetic components, makes it difficult to control alignment and placement of the openings for assembly. Thus, openings were typically manufactured with large tolerance dimension for easier alignment and connection of the backirons to the spacers. Higher powered magnet assemblies are particularly difficult to assemble and typically required expensive tools and devices to align and assemble the backirons without damaging the magnets.

Figure 4:
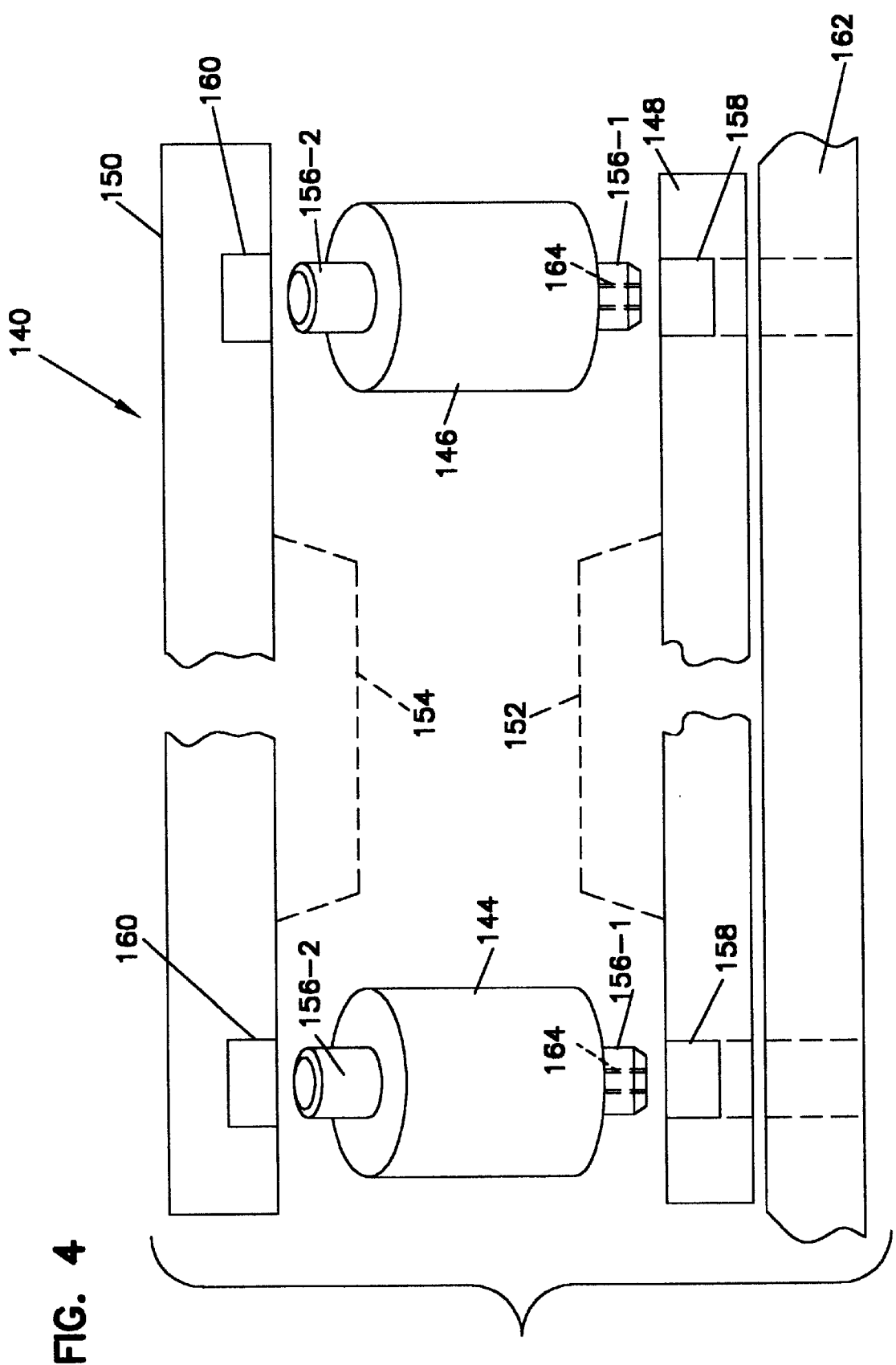
FIG. 4 is an illustration of an embodiment of an assembly including spacers supporting opposed spaced backirons of the present invention.

The present invention relates to a self centering or aligning assembly for magnetic components. In the embodiment illustrated in FIG. 4, a magnet assembly 140 includes spacers 144, 146 which support backirons 148, 150 in opposed spaced relation. Backirons 148, 150 support opposed magnets 152,154 which are magnetically attracted toward one another. As shown in FIG. 4, spacers 144,146 include opposed chamfered posts 156-1, 156-2 having chamfered ends which are sized for insertion into post holes 158, 160 on backirons 148, 150. The chamfered portion of posts centers posts 156 for insertion into post holes 158,160 for assembly. In the embodiment illustrated in FIG. 4, post holes 158 extend through the width of backiron 148 so that spacer posts 156-1 are connected to chassis 162 via a threaded fastener (not shown) in threaded bore 164 of posts 156-1. Although a particular embodiment is shown for post holes and a particular spacer shape is shown, it should be understood that post holes can extend partially through or entirely through the width of the backiron and that various shaped and sized spacers can be used to support backiron 148, 150. Further, application is not limited to the particular assembly shown including magnets 152,154 on both backiron 148,150 and can be applied to alternate magnet assembly arrangements.

For assembly, the magnetic attraction between opposed backiron-magnets is used to assemble the magnetic components. Posts 156-1 are inserted into post holes 158 of backiron 148. Backiron 150 is positioned relative to backiron 148 and spacers 144, 146 so that posts 156-2 align with post holes 160. Once aligned, the magnetic attraction between opposed backiron-magnets is used to assemble posts 156-2 of spacers 144,146 into post holes 160 of the backiron 150. The chamfered posts 156-2 self-align the posts 156-2 relative to post holes 160 so that posts 156-2 are inserted into post holes 160 while the backiron 150 is attracted toward backiron 148 and spacers 144,146.

Figure 5:
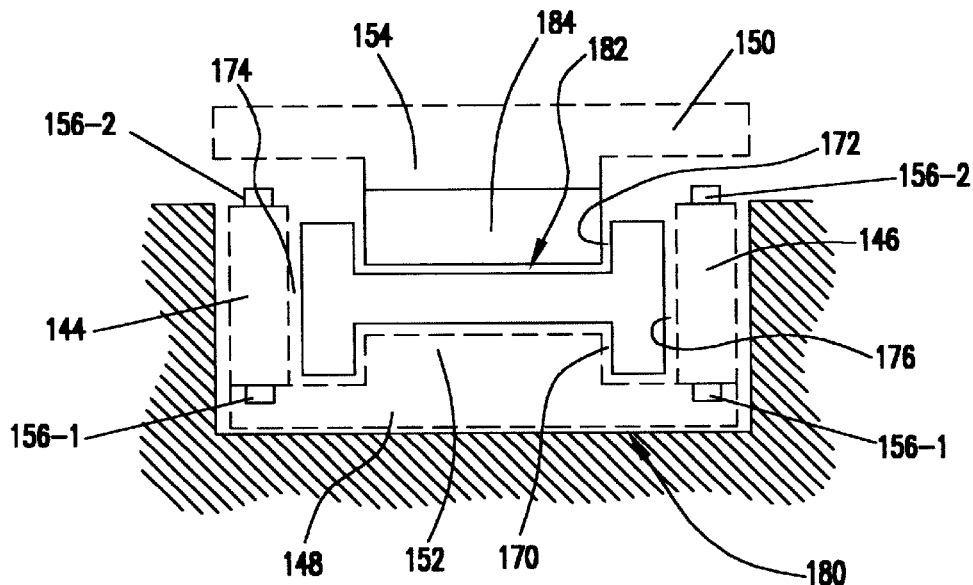
FIGS. 5–6 progressively illustrate an assembly embodiment of the present invention.
Figure 6:
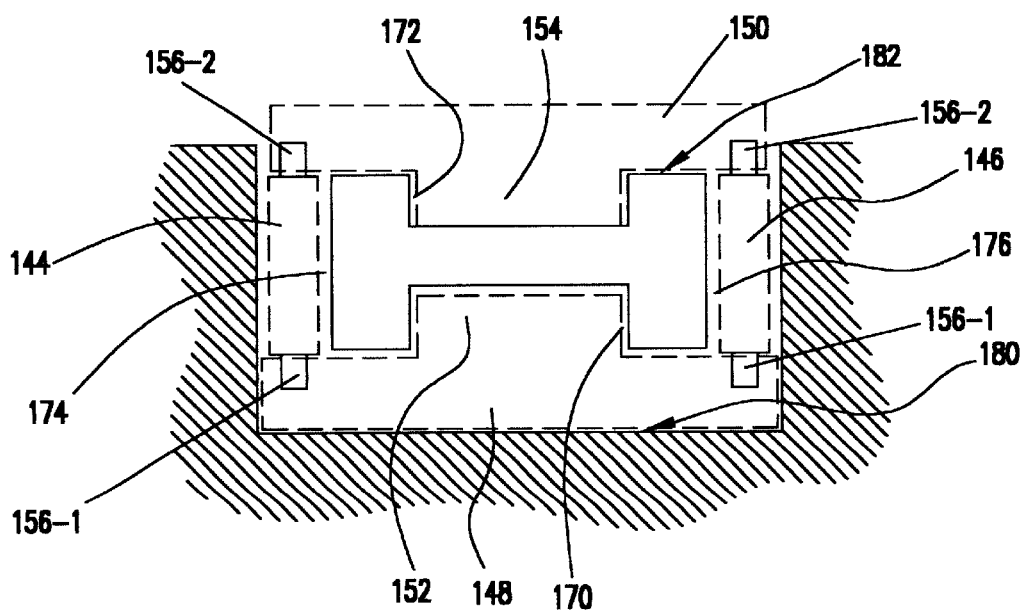

FIGS. 5–6 schematically illustrate an assembly embodiment for backirons 148,150 and spacers 144,146. As shown, assembly nests 170, 172 and spacer nests 174,176 support assembly components. Assembly nest 170 holds backiron-magnet 148,152 and assembly nest 172 holds backiron-magnet 150,154. Spacer nests 174,176 hold spacers 144,146 and are opened to assembly nests 170,172 to insert spacer posts 156 into post holes 158,160. Assembly nest 170 includes a nest floor 180 and assembly nest 172 includes a nest table 182 elevated above floor 180. Table 182 is elevated above floor 180 to contain backiron 150 in opposed spaced relation to backiron 148 as illustrated in FIG. 6. The separation between table 182 and floor 180 corresponds to the height of the spacers 144, 146 so that when spacer posts 156 are inserted into post holes 158, 160, the opposed backiron-magnets 148,152 and 150,154 are supported relative to the floor 180 and table 182 of assembly nests 170,172, respectively.

Prior to assembly, backiron-magnet 150,154 is elevated or supported above the table 182 via an assembly slide 184 as illustrated in FIG. 5. Slide 184 operates between a pre-assembly position and an assembly position. In the pre-assembly position, slide 184 is in assembly nest 172 to support backiron-magnet 150, 154 above table 182 and in the assembly position, slide 184 is retracted from the assembly nest 172 so that the backiron-magnet 150,154 is magnetically attracted toward the backiron-magnet 148,152 and drops into assembly nest 172 for assembly. Alternate assembly embodiments can be employed to conform assembly nests 170,172 and spacer nests 174,176 for use for alternate magnet assembly designs.

FIGS. 7–13 are more detailed illustrations of an assembly embodiment 200 for backirons 148,150 and spacers 144, 146. Device 200 includes a base 202, assembly nests 204, 206 and spacer nests 208, 210. As shown, assembly nests 204, 206 and spacer nests 208, 210 are cooperatively formed via assembly blocks 212,214. Assembly blocks 212, 214 are coupled to base 202 so that base 202 forms a floor of the assembly nest 204 for backiron-magnet 148, 152.

In the embodiment shown, assembly block 212 is fixedly supported relative to base 202 and assembly block 214 is rotationally supported relative to base 202 via shoulder screw 218. Assembly block 214 rotates as illustrated by arrow 220 between an opened position relative to assembly block 212 for loading components into assembly nest 204 and a closed position relative to assembly block 212 for assembling components. Latch 222 is rotationally connected to base 202 as illustrated by arrow 224 to lock assembly block 214 in the closed position. Although a particular rotational arrangement is shown, application is not limited to the particular arrangement shown. For example, assembly blocks 212, 214 can be slidably supported relative to base 202 to operate between an opened position and closed position.

Assembly blocks 212, 214 include channels 226-1, 226-2 formed between opposed spaced stepped rails 228-1, 228-2, 230-1, 230-2 and 2321, 232-2, 234-1, 234-2. A portion of channels 226-1, 226-2 and rails 230-1, 230-2, 232-1, 232-2 form a backiron-magnet table for assembly nest 206. In the embodiment shown, table includes a magnet well portion formed by channel 226 for magnet 154 and a backiron shelf formed by rails 230, 232 for supporting the backiron. As shown, an assembly slide 236 moves along a track formed by channel 226-1, 226-2 between a pre-assembly position and an assembly position as illustrated by arrow 238.

In the pre-assembly position, slide 236 is located in the assembly nest formed by portions of channels 226-1, 226-2 of assembly blocks 212, 214 to support backiron-magnet above the assembly nest table to load the backiron-magnet. For assembly, slide 236 is retracted out of assembly nest 206 so that backiron-magnet is supported by the assembly nest table with backiron supported by rails 232-1, 232-2 and magnet extending into the magnet well formed by portions of channels 226-1, 226-2. Thus, as described, assembly slide 236 elevates backiron-magnet 150, 154 above spacers 144, 146 and backiron-magnet 148, 152 prior to assembly and is withdrawn so that backiron 150 drops down into assembly nest 206 and is attracted toward backiron 148 to assembly spacers 144, 146 between backirons 148,150. In the embodiment described, assembly nests 204, 206 include a backiron portion and a magnet well portion for a magnet assembly including opposed magnets 152, 154 supported by backirons 148, 150, although application is not limited to the particular assembly nest configuration shown.

Figure 7:
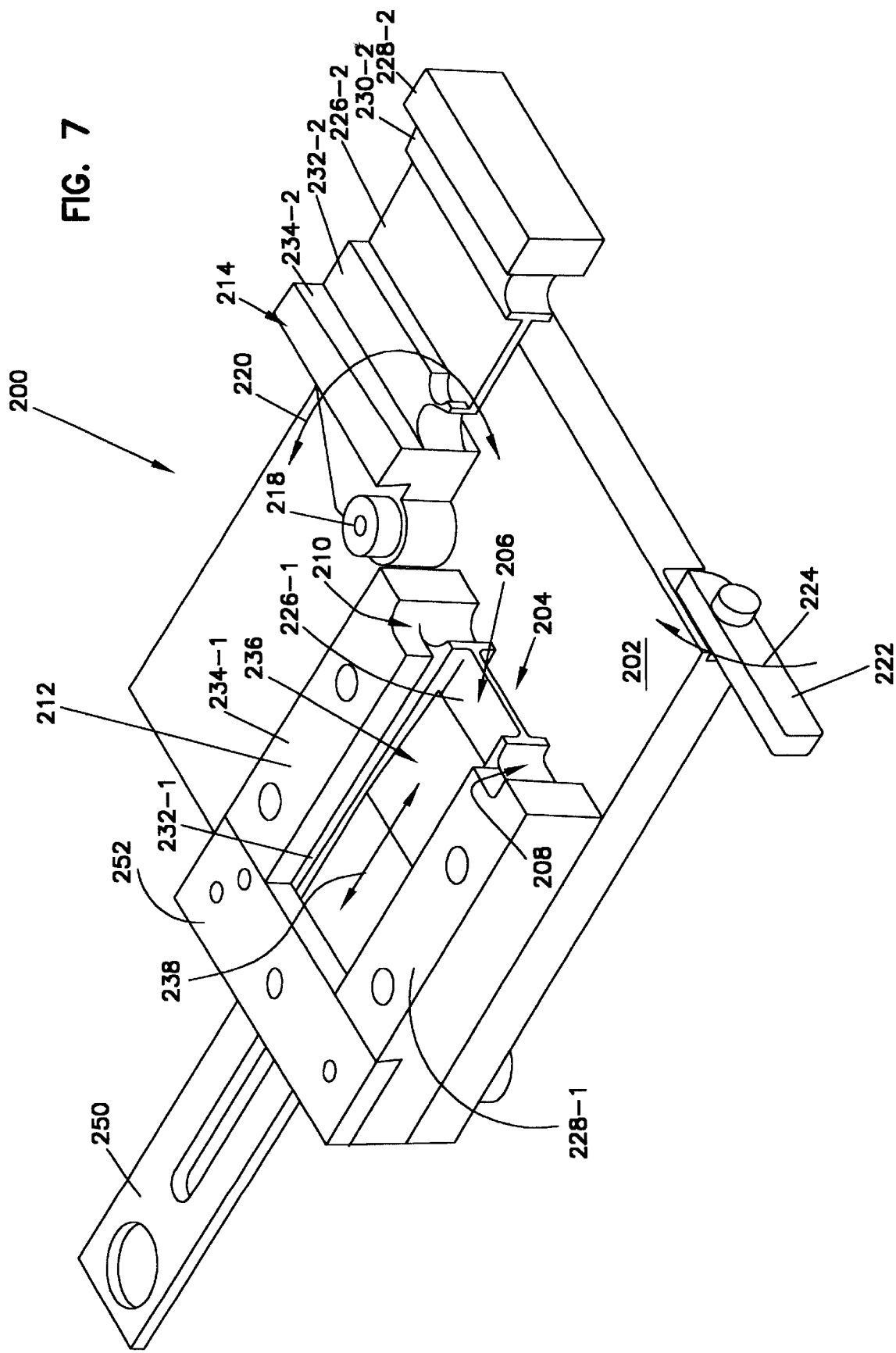
FIG. 7 is a perspective illustration of a particular assembly embodiment of the present invention.
Figure 8:
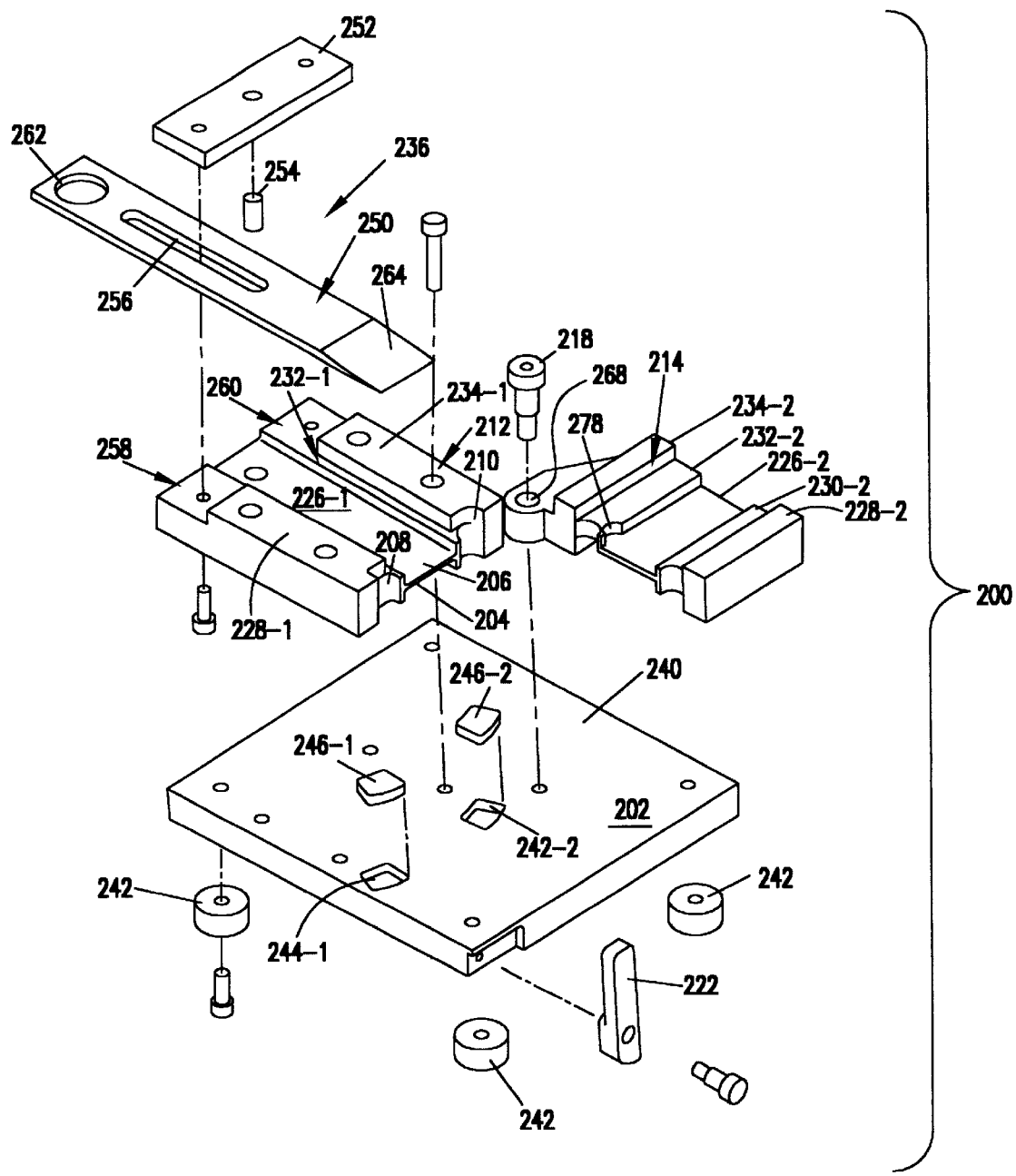
FIG. 8 is an exploded view of the embodiment of FIG. 7.

FIG. 8 is an exploded view of the embodiment of FIG. 7. As shown, base 202 includes base plate 240 having feet 242 connected thereto and extending therefrom. Base plate 240 also includes magnet cavities 244-1, 244-2. Magnets 246-1, 246-2 are supported in cavities 244-1, 244-2 to secure backiron-magnet in assembly nest 204 to limit movement of the backiron-magnet 150, 152. Preferably, the depth of the cavities 244-1, 244-2 is sufficient so that bias magnets 246-1, 246-2 are recessed 0.0002–0.0003 inches below an upper surface of plate 240 for clearance. Preferably, magnets 246-1 246-2 are glued into cavities 244-1, 244-2 using a cyanocrylic adhesive.

In particular, assembly nest 204, 206 and post nests 208, 210 are sized within tolerance dimensions to accommodate backiron assemblies and posts. The tolerance dimensions of the nests 204,206 and post nest 208, 210 is such that the backiron assemblies and posts can move or shift position in the nests. Movement of the backiron assemblies in the nests can make it more difficult to insert posts 156 into post holes.

Thus, as described, bias magnets 246-1, 246-2 secure backiron-magnet 148 in assembly nest 204 to limit movement of backiron-magnet 148, 152 in assembly nest 204 after assembly of block 214 is closed for insertion of spacer posts 156 into post holes 158 on backiron-magnet 148, 152. The magnets 246-1, 246-2 also attract spacers 144, 146 and backiron 148 to hold spacers 144,146 and backiron 148 secure during the merge or assembly of components for the magnet assembly.

In the embodiment shown, assembly slide 236 includes an elongated slide plate 250 having a width sized for insertion in channels 226-1, 226-2 and a thickness sized to elevate backiron-magnet 150, 154 above the nest table and backiron-magnet 148,152. Slide plate 250 is slidably secured in channel 226 via a slide block 252 secured to assembly block 212. Slide block 252 includes a post 254 which extends into an elongated slot 256 on slide plate 250. Slide block 252 is secured at stepped end 258, 260 of rails 228-1, 234-1 as shown. Slide plate 250 moves along post 254 on slide block 252 for controlled movement of slide 236 between a pre-assembly position and an assembly position as described. As shown, slide plate 250 includes an opening 262 to grip the slide plate 250 to move the slide between the pre-assembly position and the assembly position. As shown, slide plate 236 includes a ramp 264 to gradually release backiron-magnet 150,154 for assembly.

Figure 9:
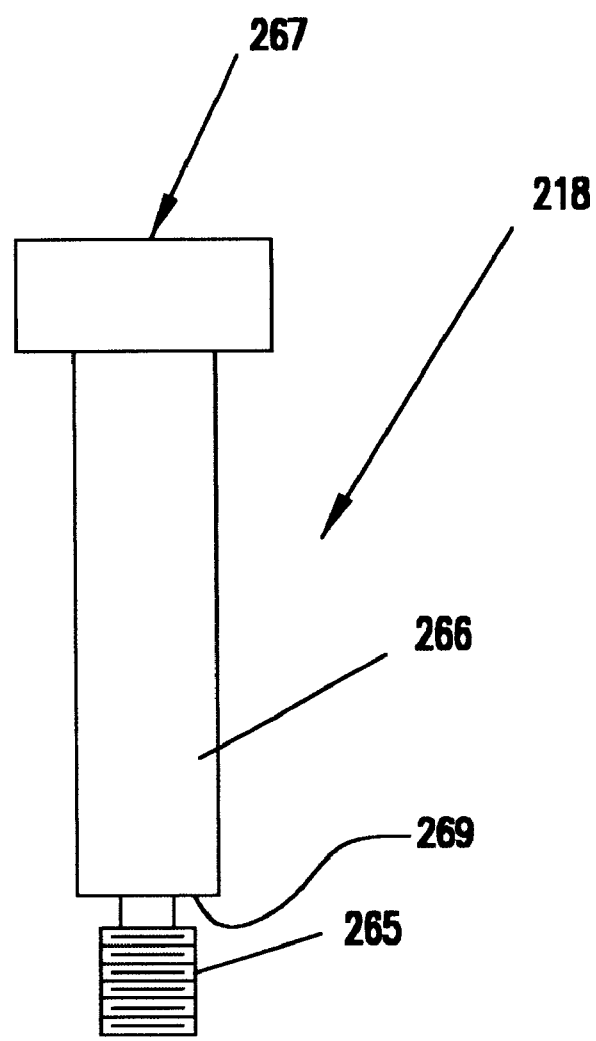
FIG. 9 is an illustration of a shoulder screw rotationally coupling an assembly block component to a tool base.
Figure 10:
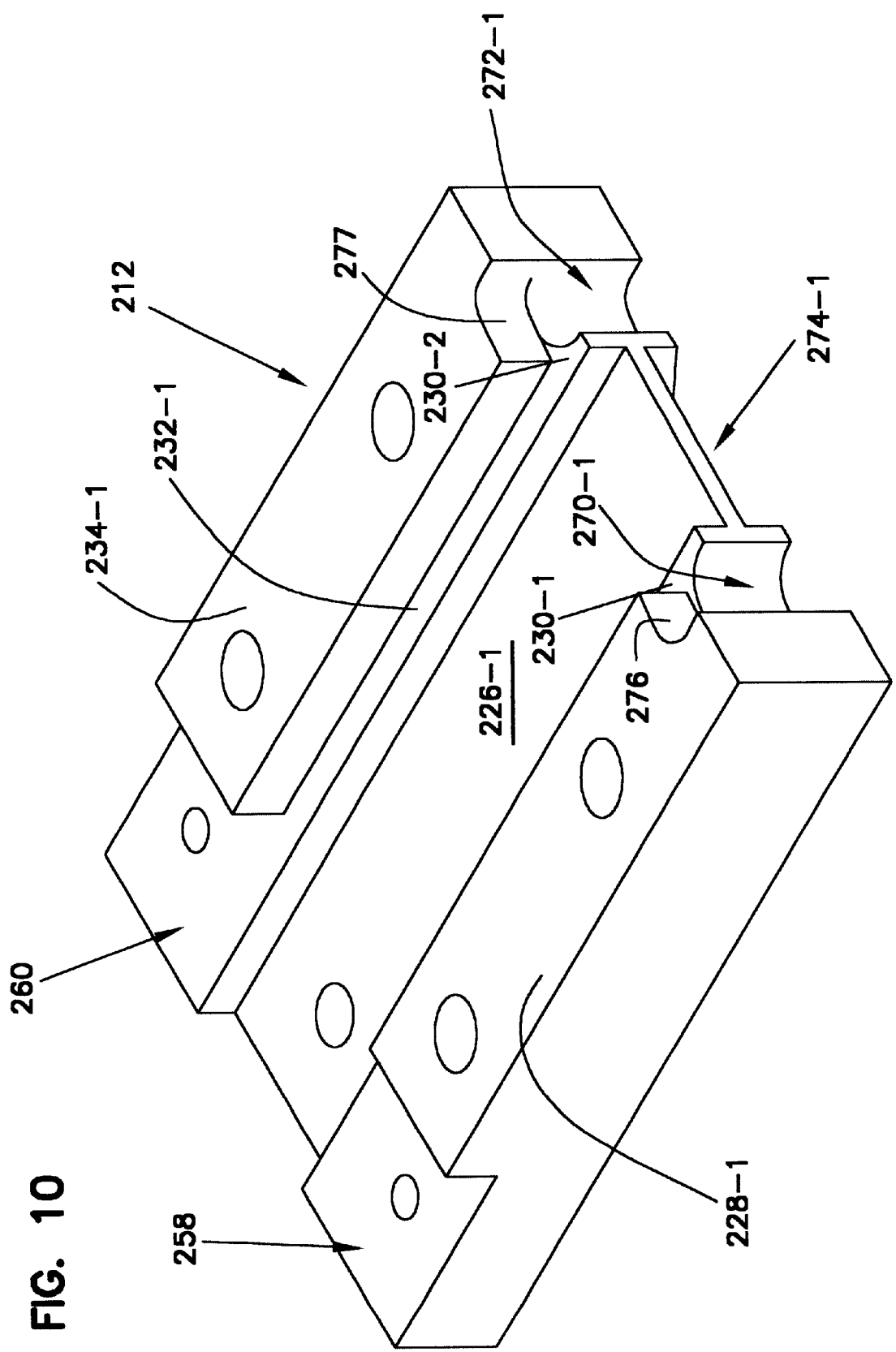
FIGS. 10–13 are perspective illustrations of assembly block components of the embodiment of FIGS. 7–8.
Figure 11:
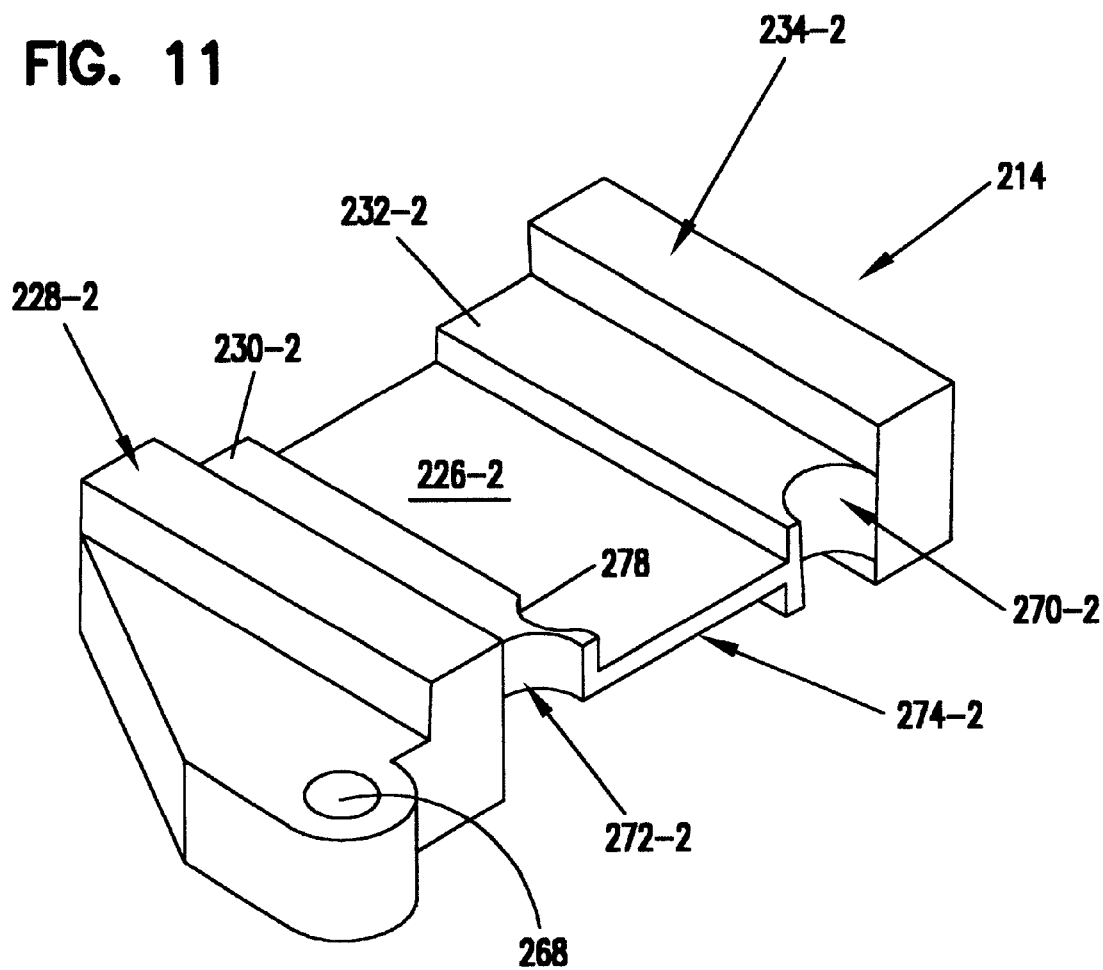

As previously explained, assembly block 214 is rotationally coupled to base 202 via shoulder screw 218. FIG. 9 illustrates an embodiment of shoulder screw 218. As shown, shoulder screw 218 includes a threaded tip 265, a shank portion 266 and a head 267. Shank portion 266 is sized to extend through an opening 268 in assembly block 214 to rotationally couple assembly block 214 to base. Shoulder screw 218 is secured to base 202 via threaded tip 265. Head 267 is sized larger than opening 268 to retain assembly block 214 on shank portion 266 to rotationally couple block 214 to base 202. Stepped edge 269 of shank portion 266 controls the depth of shoulder screw 218 relative to base 202 and provides sufficient clearance between head 267 and assembly block 214 so that assembly block 214 rotates as illustrated by arrow 220 for operation.

In the illustrated embodiment, assembly nests 204,206 and spacer nests 208, 210 are cooperatively formed by opposed formed ends of assembly blocks 212,214. In the embodiment illustrated in FIGS. 10-11, formed ends include contoured spacer well portions 270-1, 270-2, 272-1, 272-2 and stepped nest cavity portions 274-1, 274-2. In the closed position, well portions 270-1, 270-2 and 272-1, 272-2 on assembly blocks 212, 214 form spacer nests 208,.210 and stepped nest cavity portions 2741, 274-2 on assembly blocks 212, 214 form assembly nest 204 to house a backiron assembly including backiron 148 and magnet 152. In the embodiment shown, stepped rails 228,234 include contoured walls 276, 277 to form a perimeter of assembly nest 206, formed by channel 226 and rails 230, 232 for locating a backiron assembly. Rail 230-2 of block 214 includes notch 278 for magnet 154 clearance.

Figure 12:
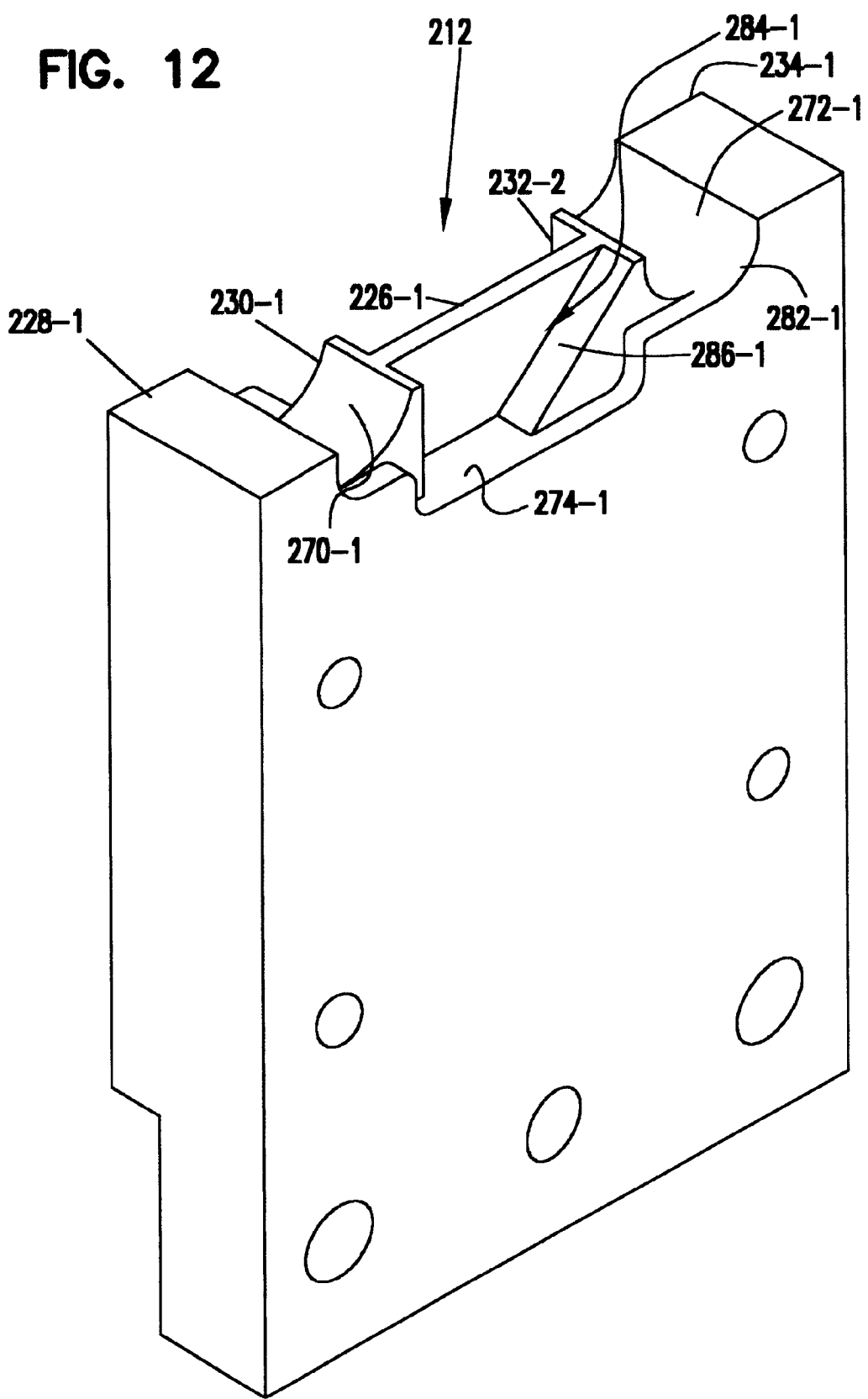
Figure 13:
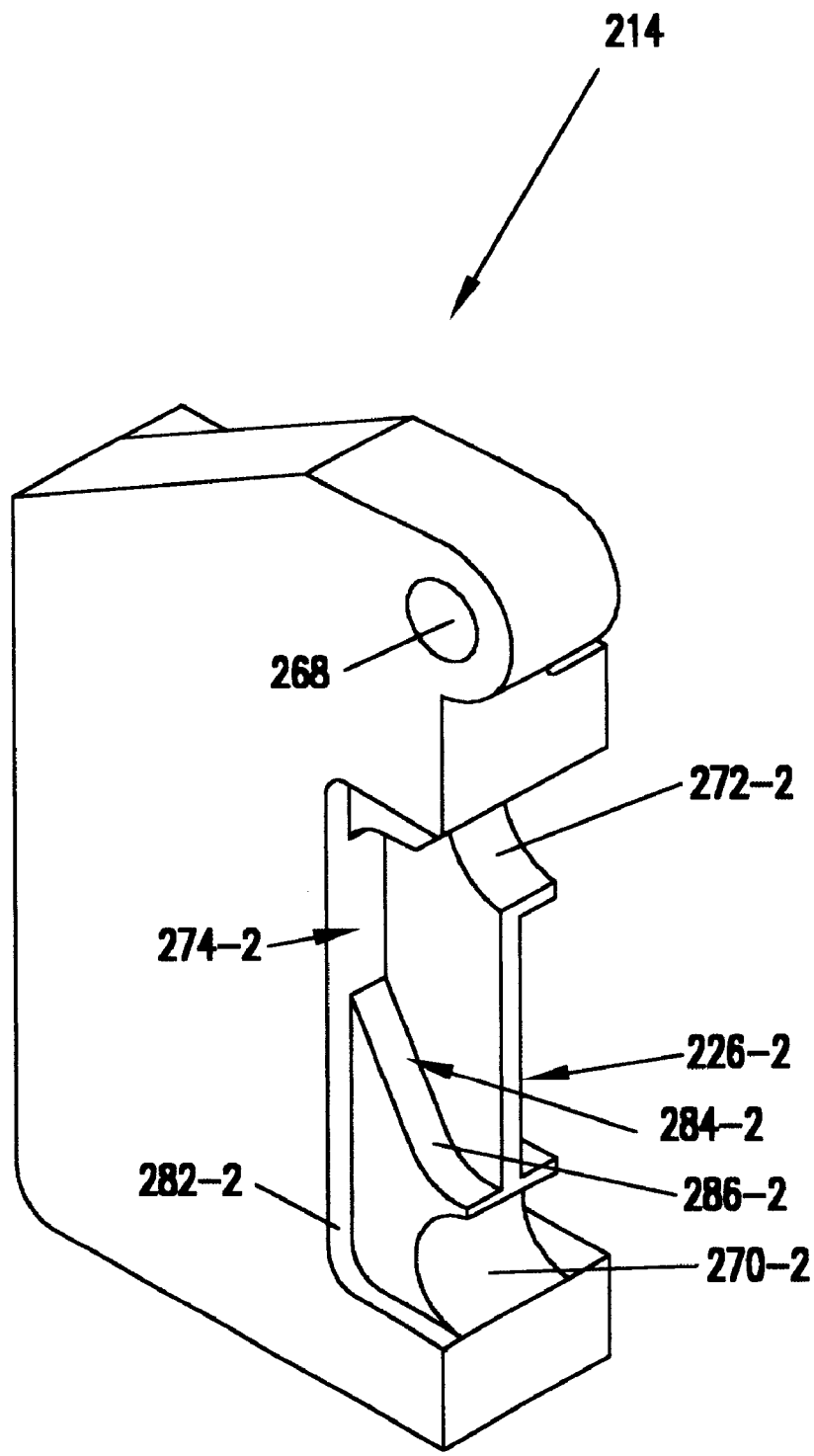

As shown in FIGS. 12 and 13, stepped nest cavity portions 274-1, 274-2 cooperatively form assembly nest 204 including backiron portions 282-1, 282-2 and magnet portions 284-1, 284-2 to house a backiron assembly including a backiron 148 and magnet 152. Backiron portions 282-1, 282-2 include walls contoured to the shape of the backiron 148 and magnet portions 284-1, 284-2, include wedges 286-1, 286-2 contoured in the shape of magnet 152 to limit movement of the backiron and magnet in the assembly nest 204. Assembly nests 204, 206 are contoured or shaped to accommodate various magnet and backiron designs and the present invention is not limited to any particular shape or design nor a magnet assembly including opposed backirons 148,150 supporting opposed magnets 152, 154 as shown. Different assembly nests and post nests can be employed depending upon the configuration of the magnet assembly components.

Figure 14:
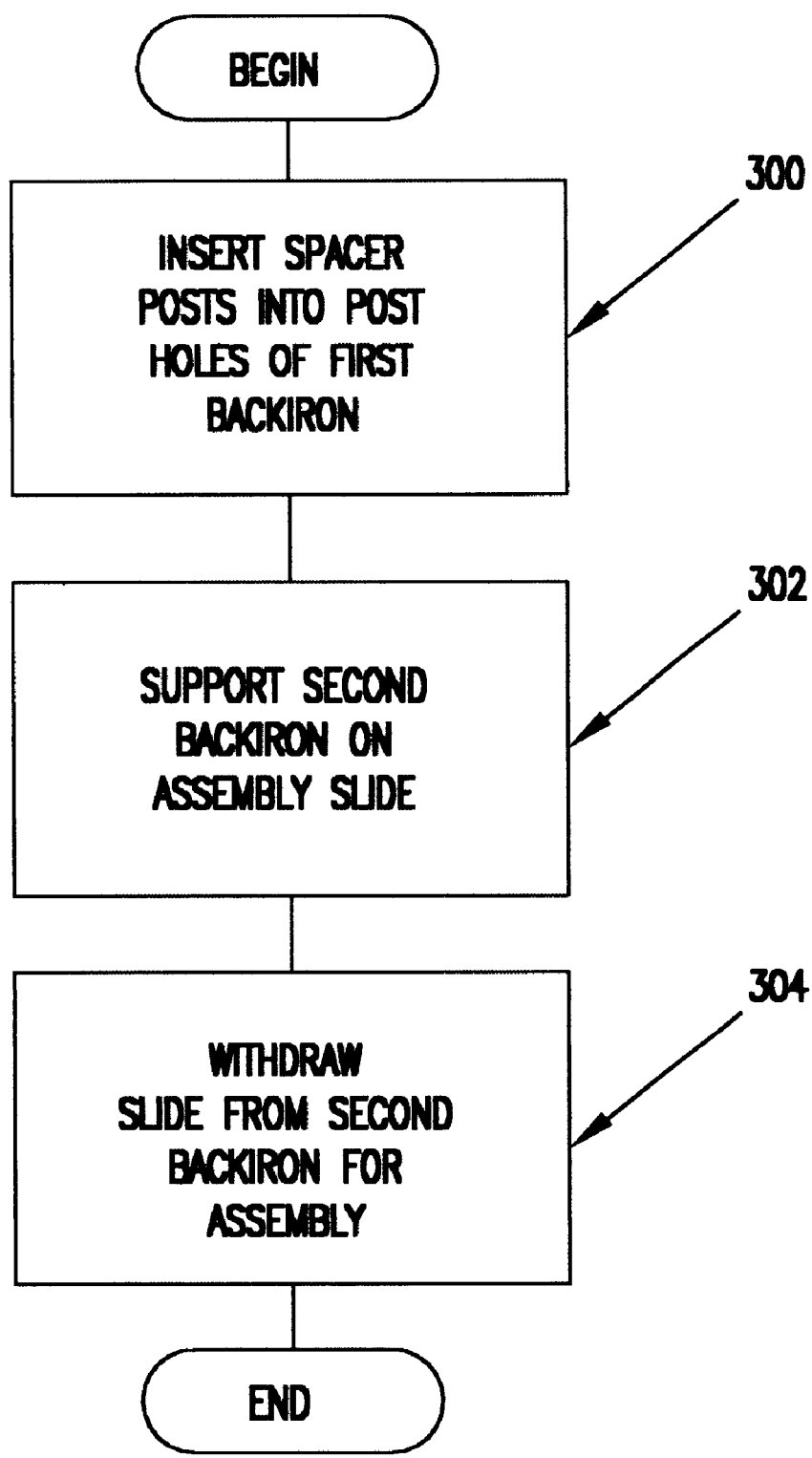
FIG. 14 is a flow chart of an assembly operation embodiment of the present invention.

FIG. 14 is a flow chart of the assembly operation of the present invention. As shown, chamfered posts 156 are inserted into post holes 158 of backiron 148 as illustrated by block 300. A second backiron is supported on an assembly slide and aligned with spacer posts 156-2 as illustrated by block 302. Assembly slide is retracted from the second backiron so that backiron assemblies are attracted toward spacer posts 144,146 for assembly as illustrated by block 304. Thus, as described, the backiron and magnet components are self aligning for assembly and can be assembled using magnetic attraction between the magnetic components for a simply, reliable and relatively inexpensive assembly process.

As previously described, with reference to FIGS. 7–8, the first backiron is supported in assembly nest 204 for assembly operations. The first backiron is loaded in assembly nest 204, while slide 236 is in the retracted position and assembly block 214 is opened. For operation, assembly block 214 is rotated closed as illustrated by arrow 220 in FIG. 7 to a latched position. Slide 236 is advanced into assembly nest 206 as previously described to support the second backiron. For assembly, posts are loaded into post holes and the second backiron is loaded onto slide 236 and aligned with posts 156 of spacers 144, 146. Thereafter, the slide 236 is retracted to assemble the second backiron on spacer posts. Upon completion, assembly block 214 is unlatched and rotated open to remove the completed assembly. As described, the nest 204 is operable between an opened position for loading operations and a closed position for assembly operations. Upon completion of the assembly process, assembly block 214 is opened to remove the completed assembly. During assembly operation, components are biased toward magnets 246-1, 246-2 to limit movement for component alignment.

A magnet assembly 100 including backirons 148,150 supported in opposed spaced relation by spacers 144, 146 having chamfered posts 156 insertable in post holes 158,160 of backirons 148,150. For assembly, chamfered posts 156 are inserted into post holes 158 on a first backiron 148. A second backiron 150 is supported spaced from the first backiron 148 by an assembly slide 236 to retain the second backiron 150 against the magnetic attraction between the first and second backirons 148,150 for preassembly alignment of the post holes 160 on the second backiron 150 relative to spacer posts 156. The assembly slide 236 is withdrawn from the second backiron 150 so that second backiron 150 is attracted toward the first backiron 148 and spacer posts 156 are inserted into post holes 160 on the second backiron 150 for assembly.

It is to be understood that even through numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnet assembly for a particular disc drive system, it will be appreciated by those skilled in the art that the teachings of the present invention can be applied to other systems, such as an optical drive, without departing from the scope and spirit of the present invention.

What is claimed is:

1. A method for assembling a magnet assembly comprising steps of:
   a) providing first and second backirons having a magnet supported on at least one of the first or second backirons;
   b) inserting spacer posts into post holes of the first backiron;
   c) releasably supporting the second backiron relative to the first backiron on an assembly slide; and
   d) withdrawing the assembly slide from the second backiron so that the second backiron is attracted toward the first backiron to assemble spacer posts into post holes on the second backiron.

2. The method of claim 1 comprising a step of:
   e) biasing assembly components in an assembly position for assembly operation.

3. The method of claim 1 comprising steps of:
   e) moving the assembly slide in a first direction to support the second backiron; and
   f) moving the assembly slide in a second opposed direction to withdraw the assembly slide from the second backiron.

4. The method of claim 1 wherein a first assembly nests for the first backiron is formed between assembly blocks operable between an opened position and a closed position and comprising steps of:
   e) opening the assembly blocks to insert the first backiron into the first assembly nest; and
   f) closing the assembly blocks for assembly.

5. The method of claim 4 wherein at least one of the assembly blocks is rotationally connected to an assembly base and opening and closing the assembly blocks, comprising a step of:
   g) rotating the at least one assembly block rotationally connected to the assembly base to open and close the assembly blocks.

6. The method of claim 4 including a latch for locking the assembly blocks in the closed position, and comprising a step of:
   g) actuating the latch to lock the assembly blocks in the closed position.

7. The method of claim 4 wherein the assembly blocks form spacer nests in the closed position and after closing the assembly blocks comprising a step of:
   g) loading spacers into the spacer nests to insert the spacer posts into the post holes on the first backiron.

8. The method of claim 4 and after closing the assembly blocks comprising steps of:
   g) advancing the assembly slide into a second assembly nest to slideably support the second backiron; and
   h) retracting the assembly slide from the second assembly nest to withdraw the assembly slide from the second backiron for assembly.

* * * * *